May 17, 1966 R. M. ASTLEY 3,251,630
VEHICLE WHEEL ASSEMBLY
Filed June 26, 1964
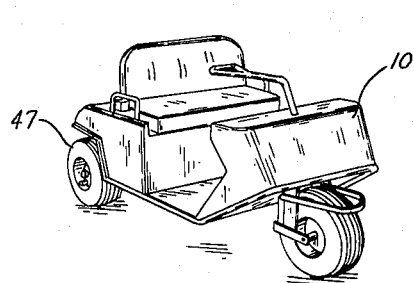
Fig. 1
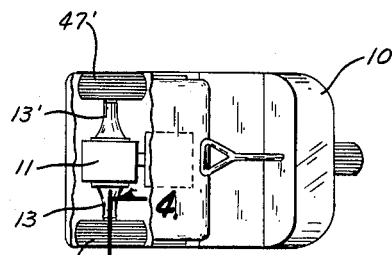
Fig. 2
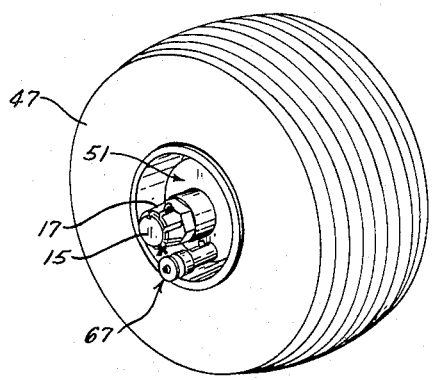
Fig. 3
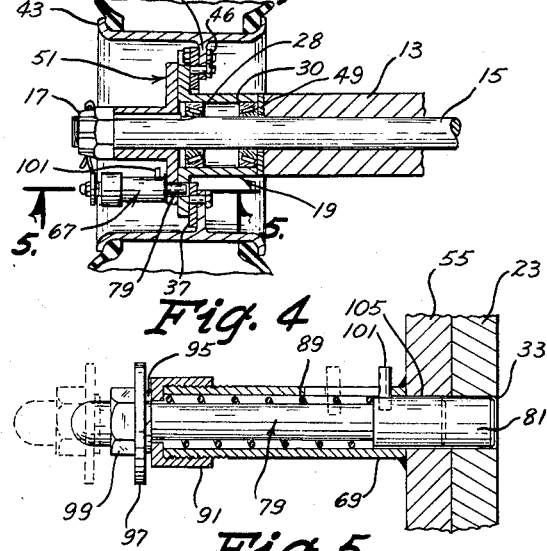
Fig. 4
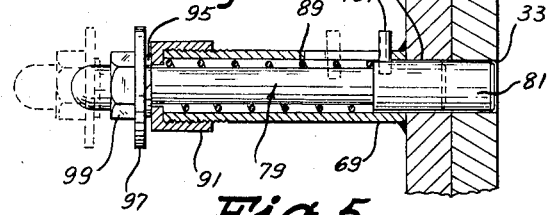
Fig. 5
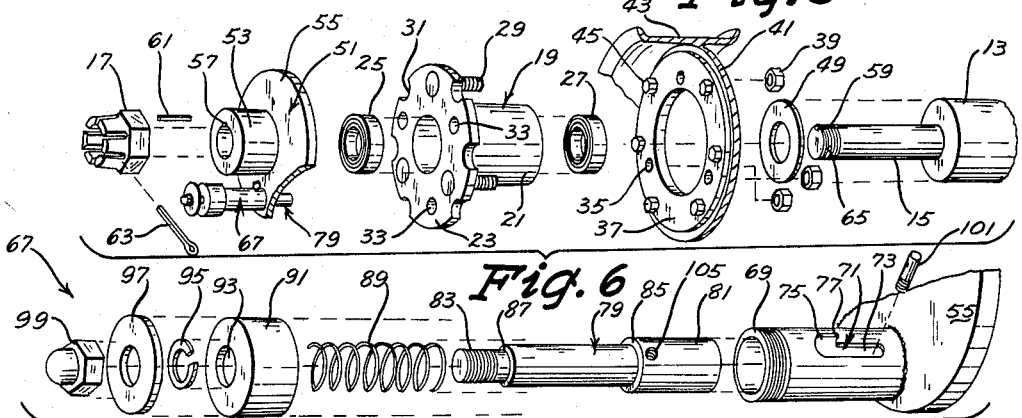
Fig. 6
Fig. 7
INVENTOR
ROBERT M. ASTLEY
BY Duck & Zarley
ATTORNEYS

United States Patent Office 3,251,630
Patented May 17, 1966

3,251,630
VEHICLE WHEEL ASSEMBLY
Robert M. Astley, 2237 Montery Drive,
Des Moines, Iowa
Filed June 26, 1964, Ser. No. 378,330
3 Claims. (Cl. 301—1)

This invention relates to a vehicle wheel assembly and more particularly to a vehicle wheel assembly for a golf car.

Golf cars are used to transport golfers over the terrain of the golf course and have gained wide acceptance in recent years. The golf cars are either stored at the golf course or at a remote location when not in use. When the golf car is stored at a location remote from the golf course it becomes necessary to transport the golf car to the course when the golfer desires to use the vehicle. The usual means for transporting the golf car to the golf course is to load it on a trailer and to pull the trailer behind the golfer's automobile. The loading and unloading of the golf car from the trailer is a tiresome and bothersome task at best. The most convenient method of transporting the golf car from one location to another is to pull the golf car directly behind the automobile without utilizing a trailer. This method is only safely possible if the automobile moves at an extremely slow rate of speed as a result of the driving wheels of the golf car being directly connected to the differential which is in turn directly connected to the transmission. As the golf car is being pulled, the driving wheels rotate the axle which in turn causes the differential and a portion of the transmission to be operated as well. These parts of the golf car are not designed for high speeds and would soon wear out if the golf car was pulled at any appreciable rate of speed.

Therefore, it is a principal object of this invention to provide a vehicle wheel assembly which permits the vehicle wheel to be operatively disengaged from the vehicle axle.

A further object of this invention is to provide a vehicle wheel assembly which may be installed with a minimum of fabrication of the existing wheel assembly.

It is a further object of this invention to provide a vehicle wheel assembly which permits the vehicle wheel to be operatively disengaged from the vehicle axle quickly and easily.

It is a further object of this invention to provide a vehicle wheel assembly which may be adapted to fit a variety of different makes and types of wheels.

It is a further object of this invention to provide a vehicle wheel assembly which will be substantially maintenance free.

It is a further object of this invention to provide a vehicle wheel assembly which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of a golf car;

FIG. 2 is a top elevational view of a golf car having a portion thereof cut away;

FIG. 3 is a perspective view of the outer portion of the device associated with a wheel of a golf car;

FIG. 4 is a sectional view of the device as seen on line 4—4 of FIG. 2 at an enlarged view;

FIG. 5 is a sectional view of the device as seen on line 5—5 of FIG. 4 at an enlarged view;

FIG. 6 is an exploded perspective view of the device; and

FIG. 7 is an exploded perspective view of the detent means portion of the device.

The numeral 10 generally designates a golf car having a differential 11, axle housings 13 and 13' and axle 15 extending therein. Axle 15 extends outwardly of axle housing 13 and has its outer end externally threaded to receive a lock nut 17.

A hub 19 comprised of a hollow cylindrical sleeve member 21 having a flange 23 extending radially outwardly from the outer end thereof is rotatably mounted on axle 15. Roller bearings 25 and 27 are mounted on axle 15 and are received by the interior of cylindrical sleeve member 21. Cylindrical sleeve member 21 has shoulder elements 28 and 30 in its interior for maintaining roller bearings 25 and 27 in a spaced relationship.

Flange 23 has a plurality of threaded stud bolts 29 secured thereto extending horizontally inwardly therefrom which are substantially equally spaced from each other adjacent the periphery of flange 23. Flange 23 is also provided with a plurality of notches 31 extending inwardly into its outer edge. Flange 23 is also provided with a plurality of holes 33 extending therethrough as illustrated in FIG. 6. Stud bolts 29 are adapted to be received by holes 35 in a flat circular plate 37 and maintained therein by means of nuts 39. Plate 37 has its center portion cut-away to receive sleeve member 21 as illustrated in FIGS. 2 and 6. Plate 37 is secured to flange 41 of a conventional tire rim 43 by means of bolts 45 and nuts 46. A conventional pneumatic tire 47 is mounted on tire rim 43 in usual fashion. It should be noted that notches 31 of flange 23 are adapted to receive the head portions of bolts 46 as illustrated in FIG. 4.

A flat washer 49 embraces axle 15 between the inner end of sleeve member 21 of hub 19 and housing 13 as illustrated in FIGS. 4 and 6. A locking assembly 51 comprised of a cylindrical sleeve 53 having a flange 55 extending outwardly at the inner end thereof slidably embraces the outer end of axle 15. Sleeve 53 has a keyway 57 cut in its inner periphery which registers with keyway 59 of axle 15 both of which are adapted to receive key 61 to prevent any rotational movement between locking assembly 51 and axle 15. Lock nut 17 is threadably received by the external threads on the outer end of axle 15 and is maintained thereon by means of cotter key 63 extending through lock nut 17 and hole 65 in axle 15.

A detent means 67 is secured to flange 55 as illustrated in FIGS. 5 and 7. Detent means 67 includes a pipe stub 69 which has its inner end secured to flange 55 by welding or the like. Pipe stub 69 has a slot 71 which has a straight portion 73 extending parallel to the longitudinal axis of pipe stub 69 and an arcuate portion 75 first extending laterally to the outer end of straight portion 73 and then extending inwardly with respect to flange 55. A protrusion 77 is formed between straight portion 73 and arcuate portion 75 of slot 71. Detent means 67 also includes a plunger member 79 which slidably extends into pipe stub 69 and has an enlarged diameter portion 81 on its inner end and a reduced diameter portion 83 on its outer end which is provided with external threads. A shoulder 85 is formed at the outer end of enlarged diameter portion 81 and a shoulder 87 is formed at the inner end of reduced diameter portion 83. A spring 89 embraces plunger member 79 and has its inner end engaging shoulder 85. A pipe cap 91 having internal threads is threadably received by the external threads on pipe stub 69 and has a hole 93 therein which is adapted to slidably receive that portion of plunger member 79 which is outwardly of shoulder 85. Pipe stub 69 maintains spring 89 on plunger member 79. A lock washer 95 is received by reduced diameter portion 83 and engages shoulder 85.

A flat washer 97 is received by reduced diameter portion 83 and has its inner end engaging the outer end of lock washer 95. A cap nut 99 is threadably received by the external threads on reduced diameter portion 83. A pin 101 is threadably inserted into hole 103 in enlarged diameter portion 81 of plunger 79 and extends outwardly through slot 71. The inner end of enlarged diameter portion 81 is slidably received by hole 105 in flange 55 and is also slidably received by one of holes 33 in flange 23. The normal method of operation is as follows. The device will be installed as described on the outer ends of each of axle 15 and 15'. Enlarged diameter portion 81 of plunger member 79 would normally be extending through hole 105 in flange 55 and through one of holes 33 in flange 23 of hub 19. Because the outer end of axle 15 is keyed with locking assembly 51 by means of key 61, any rotation of axle 15 will cause rotation of locking assembly 51 as well. Rotational movement of locking assembly 51 will also cause hub 19 to rotate due to enlarged diameter portion 81 of plunger member 79 extending into one of holes 33. Inasmuch as stud bolts 29 extend through holes 35 of circular plate 37 any rotational movement of hub 19 will be transmitted to circular plate 37 which will cause wheel 47 to be rotated. These relative positions would be maintained during the normal operation of golf car 10.

When it is desired to move golf car 10 for any appreciable distance it is simply necessary to disengage enlarged diameter portion 81 of plunger member 79 from hole 33. This is accomplished by grasping washer 97 and pulling outwardly thereon. The outward movement of washer 97 will obviously cause plunger member 79 to be likewise moved outwardly and also cause pin 101 to move within slot 71. Washer 97 and plunger 79 are moved outwardly until pin 101 has reached the outer end of straight portion 73 of slot 71 and then are rotated to allow pin 101 to enter arcuate portion 75 of slot 71. Spring 89 will yieldably force pin 101 to move inwardly in arcuate portion 75 until the inner end thereof is reached. Spring 89 will yieldably prevent pin 101 from disengaging from its position in arcuate portion 75. In the position just described the inner end of plunger member 79 will be completely removed from hole 33 in hub 19 as illustrated by broken lines in FIG. 5. The removal of plunger member 79 from hole 33 disengages any direct connection between locking assembly 51 and hub 19. This means that hub 19 will rotate about bearings 25 and 27 on axle 15 without rotating locking assembly 51 or axle 15. The procedure just described would be followed for each of the rear wheels. The golf car may then be pulled behind an automobile at high rates of speed without axle 15 or differential 11 being operated.

When it is desired to re-engage the wheels with axle 15 it is simply necessary to move plunger 79 outwardly, rotate it and allow pin 101 to re-enter straight portion 73 of slot 71. Spring 89 will yieldably hold pin 101 in this position. The inner end of plunger 79 is permitted to enter one of holes 33 and the vehicle is in normal operating condition again.

Plate 37 may be altered to fit any different types of rims while hub 19 and locking assembly 51 may be altered to fit any number of different axles. For best results it is desired that hub 19 and locking assembly 51 be constructed of steel or iron.

Thus from the foregoing it can be seen that the device accomplishes at least all of its stated objectives.

Some changes may be made in the construction and arrangement of my vehicle wheel assembly without departing from the real spirit and purpose of my invention, and it is my intention to cover by my claims, any modified forms of structure or use of mechanical equivalents which may be reasonably included within their scope.

I claim:

1. In a wheel assembly for a vehicle having a rotatable axle,
a hub means having inner and outer ends rotatably mounted on said axle,
said hub comprised of a hollow cylindrical sleeve member having a flange member extending outwardly at a right angle from its outer end,
a bearing means embracing said axle between said axle and said sleeve member,
a plurality of threaded stud bolts secured to said flange member and extending substantially horizontally inwardly therefrom,
said threaded stud bolts being operatively secured to a wheel means,
said flange member having at least one hole extending therethrough,
a locking assembly embracing said axle outwardly of said flange member of said hub means,
said locking assembly comprised of a collar member having inner and outer ends and having secured at right angle to its inner end a flat circular plate member,
means on said axle and said locking assembly to maintain said locking assembly thereon and to prevent rotational movement between said axle and said locking means,
and a detent means extending through said flat circular plate member having a plunger member removably engaging said hole in said flange member.

2. The device of claim 1 wherein said pin may be locked in an extended position and in a withdrawn position.

3. In a wheel assembly for a vehicle having a rotatable axle,
a hub means having inner and outer ends rotatably mounted on said axle,
said hub comprised of a hollow cylindrical sleeve member having a flange member extending outwardly at a right angle from its outer end,
a bearing means embracing said axle between said axle and said sleeve member,
a plurality of threaded stud bolts secured to said flange member and extending substantially horizontally inwardly therefrom,
said threaded stud bolts being operatively secured to a wheel means,
said flange member having at least one hole extending therethrough,
a locking assembly embracing said axle outwardly of said flange member of said hub means,
said locking assembly comprised of a collar member having inner and outer ends and having secured at a right angle to its inner end a flat circular plate member,
means on said axle and said locking assembly to maintain said locking assembly thereon and to prevent rotational movement between said axle and said locking means,
and a detent means extending through said flat circular plate member having a plunger member removably engaging said hole in said flange member,
said detent means including a pipe stub secured to said flat circular plate and extending horizontally outwardly therefrom and having external threads on its outer end; said pipe stub having an elongated slot formed therein having a straight portion extending substantially parallel to the longitudinal axis of said pipe stub and an arcuate portion extending laterally and inwardly from the outer end thereof; a plunger member slidably extending through said pipe stub and a hole in said flat circular plate; a spring embracing said plunger member yieldably forcing said plunger member inwardly; a pipe cap threadably secured to said pipe stub and adapted to slidably receive the outer end of said plunger member; means on the outer end of said plunger member for moving said plunger member at times, and a pin extending through said slot and rigid with said plunger member.

References Cited by the Examiner
UNITED STATES PATENTS

| | | | |
|---|---|---|---|
| 214,246 | 4/1879 | Fish | 192—67 |
| 1,168,142 | 1/1916 | Akins | 192—67 |
| 1,562,607 | 11/1925 | Amiott | 192—67 |
| 2,401,178 | 5/1946 | Oehler et al. | 287—53 |
| 2,693,393 | 11/1954 | Heth | 301—1 |
| 2,788,103 | 4/1957 | Requa | 287—53 |
| 2,858,163 | 10/1958 | Nagel | 301—1 |
| 2,863,517 | 12/1958 | Mitchell | 192—95 |
| 2,874,814 | 2/1959 | Beck | 192—67 |
| 3,017,207 | 1/1962 | Lloyd | 287—53 |

FOREIGN PATENTS

| | | |
|---|---|---|
| 178,482 | 5/1954 | Austria. |
| 1,269,806 | 10/1961 | France. |

KENNETH H. BETTS, *Primary Examiner.*